(12) United States Patent
Shirakawa (10) Patent No.: US 9,021,489 B2
(45) Date of Patent: Apr. 28, 2015

(54) START, SUSPEND AND RESUME AN APPLICATION PROGRAM WHERE THE APPLICATION PROGRAM UTILIZES THE SAME HANDLE TO IDENTIFY A RESOURCE UPON RESUMPTION

(76) Inventor: Takahisa Shirakawa, Tokyo (JP)

( * ) Notice: Subject to any disclaimer, the term of this patent is extended or adjusted under 35 U.S.C. 154(b) by 696 days.

(21) Appl. No.: 12/496,151

(22) Filed: Jul. 1, 2009

(65) Prior Publication Data

US 2010/0005475 A1 Jan. 7, 2010

(30) Foreign Application Priority Data

Jul. 7, 2008 (JP) .................................. 2008-176436

(51) Int. Cl.
*G06F 9/46* (2006.01)
*G06F 9/48* (2006.01)

(52) U.S. Cl.
CPC ................ *G06F 9/485* (2013.01); *G06F 9/461* (2013.01); *G06F 2209/482* (2013.01)

(58) Field of Classification Search
CPC ......... H04L 29/06; G06F 9/485; G06F 9/461; G06F 2209/482; G06K 9/00369; G06Q 10/06
See application file for complete search history.

(56) References Cited

U.S. PATENT DOCUMENTS

| | | | | |
|---|---|---|---|---|
| 5,999,943 A * | 12/1999 | Nori et al. | ............................... | 1/1 |
| 6,247,057 B1 * | 6/2001 | Barrera, III | ................... | 709/229 |
| 6,848,106 B1 * | 1/2005 | Hipp | ............................... | 719/312 |
| 7,010,553 B2 * | 3/2006 | Chen et al. | ............................... | 1/1 |
| 7,103,625 B1 * | 9/2006 | Hipp et al. | ..................... | 709/201 |
| 7,590,839 B2 * | 9/2009 | van der Veen et al. | ............ | 713/2 |
| 7,627,728 B1 * | 12/2009 | Roeck et al. | ................... | 711/162 |
| 2003/0088574 A1 * | 5/2003 | White et al. | ................... | 707/102 |

FOREIGN PATENT DOCUMENTS

| JP | 01-205343 A | 8/1989 |
|---|---|---|
| JP | 02-245828 A | 10/1990 |
| JP | 1994161590 A | 6/1994 |
| JP | 2005-4350 | 7/2006 |

OTHER PUBLICATIONS

Japanese Office Action issued Oct. 30, 2012 for Application No. 2008-176436 (11 Pages).
Japanese Office Action issued Aug. 7, 2012 for Application No. 2008-176436 (5 Pages).

* cited by examiner

*Primary Examiner* — Meng An
*Assistant Examiner* — Wissam Rashid
(74) *Attorney, Agent, or Firm* — Nutter McClennen & Fish LLP; John J. Penny, Jr.; Megan E. Jeans (57) ABSTRACT

An information processing device is configure so as to store an image that is to be retained in a main memory so that a processor can execute an application program, and after execution of the application program is terminated, execute the application program from a state at a time when the image is stored by reading out the stored image to the main memory.

7 Claims, 7 Drawing Sheets

| HANDLE | RESOURCE | APPLICATION | STATE | ALTERNATIVE HANDLE |
|---|---|---|---|---|
| f01 | C:¥user¥Presentation.ppt | PRESENTATION | USED | |
| f02 | C:¥user¥Spreadsheet.xls | SPREADSHEET | SUSPENDED | |
| f03 | C:¥user¥Document.doc | WORD-PROCESSOR | SUSPENDED | |

Fig. 5A

| HANDLE | RESOURCE | APPLICATION | STATE | ALTERNATIVE HANDLE |
|---|---|---|---|---|
| f01 | C:¥user¥Presentation.ppt | PRESENTATION | USED | |
| f02 | C:¥user¥Spreadsheet.xls | SPREADSHEET | SUSPENDED | |
| f03 | C:¥user¥Document.doc | WORD-PROCESSOR | USED | f11 |

| APPLICATION | RESOURCE | INSTRUCTION |
|---|---|---|
| WORD-PROCESSOR | C:\user\Document.doc | READ |
| WORD-PROCESSOR | SCREEN | DISPLAY |

Fig. 7

START, SUSPEND AND RESUME AN APPLICATION PROGRAM WHERE THE APPLICATION PROGRAM UTILIZES THE SAME HANDLE TO IDENTIFY A RESOURCE UPON RESUMPTION

INCORPORATION BY REFERENCE

This application is based upon and claims the benefit of priority from Japanese patent application No. 2008-176436, filed on Jul. 7, 2008, the disclosure of which is incorporated herein in its entirety by reference.

BACKGROUND OF THE INVENTION

1. Field of the Invention

The present invention relates to an information processing device that enables an application program to use a hardware resource managed by the operating system, and in particular an information processing device capable of suspending and resuming an application program running in multitask processing environment.

2. Description of Related Art

Work that is being carried out by an application program running on an information processing device such as a personal computer may sometimes be temporarily suspended. In such a case, if the application program is left running on the information processing device, the work data at some midpoint may be altered or lost because of accidental manipulation by the user itself or manipulation by other persons who are not using that application program. Therefore, such a situation is undesirable.

In order to solve a problem like this, it has been proposed that the information processing device as a whole be temporarily brought into an unusable state such as a screen-locked/suspended/hibernated state while maintaining the operation state of the application program. Japanese Unexamined Patent Application Publication No. 6-161590 discloses an information processing device capable of hibernating.

Furthermore, as another solution for such a problem, work contents that are processed halfway through the work by an application program may be stored as data in common practice.

When an application program is being executed on an information processing device disclosed in Japanese Unexamined Patent Application Publication No. 6-161590, if the application is to be interrupted, the information processing device as a whole is brought into an unusable state. That is, when a user wants to temporarily stop document creation using a word-processor and to carry out aggregate calculation using a spreadsheet, the entire information processing device is brought to an unusable state even though the user wants to suspend only the work using the word-processor. Consequently, the user cannot carry out the aggregate calculation work using the spreadsheet as well as the work using the word-processor, and thus impairing usability.

Furthermore, when work contents on which an application program has been executed halfway through the work is to be stored as data, only the work contents are stored. Therefore, information about the displayed portion and the display state at the time of the interruption is lost. A user who wants to resume the work has to take trouble such as finding and displaying the displayed portion, and reproducing the work state using his memory, and thus further impairing usability.

In such a case, if the work state in the application program can be also stored as data, it becomes possible to resume the work state at the time of the interruption based on the stored data, so that the user can resume the work without any trouble. However, in recent years, implementation of multitask processing in which two or more application programs are executed in parallel has become common in information processing devices such as personal computers.

In multitask processing environment, there is a possibility that a user reumes a stored application program in a state where a computer resource that was used by the application program before the interruption is being used by other applications at the time of the resumption, and thus causing access conflict for that computer resource and consequently a malfunction of the information processing device.

Accordingly, an exemplary object of the invention is to provide an information processing device that can store an execution state of an application program running on multitask processing environment and resume the application program based on the stored execution state.

SUMMARY

A first information processing device according to an exemplary aspect of the invention is an information processing device that stores an image that is to be retained in a main memory so that a processor can execute an application program, and after execution of the application program is terminated, executes the application program from a state at a time when the image is stored by reading out the stored image to the main memory, the information processing device including a resource management unit that, upon an access request from the application program to a resource, specifies an identifier to identify the resource and notifies the identifier to the application program, and invalidates the identifier upon a request from the application program or after a lapse of a predefined time, wherein when the application program is to be executed by reading out the stored image to the main memory, the information processing device replaces the identifier stored in the image with a newly issued identifier and causes the application program to access to the resource corresponding to the stored identifier.

A second information processing device according to another exemplary aspect of the invention is an information processing device that allocates a predefined area in a volatile storage unit in which memory contents will disappear upon suspension of power supply to an application program, and carries out information processing based on information stored in the area, the information processing device including a storage unit that stores an operation image of the application program in a nonvolatile storage unit in which the operation image will not disappear upon suspension of power supply, and a read out unit that reads out the operation image from the nonvolatile storage unit and stores the read-out operation image in the volatile storage unit.

A third information processing device according to another exemplary aspect of the invention stores an image that is to be retained in a first memory so that a processor can execute an application program in a second memory, and after execution of the application program is terminated, executes the application program from a state at a time when the image is stored by reading out the stored image to the first memory.

An information processing method according to an exemplary aspect of the invention includes storing an image that is to be retained in a main memory so that a processor can execute an application program, and after execution of the application program is terminated, reading out the stored image to the main memory and executing the application program from a state at a time when the image is stored.

A fourth information processing device according to an exemplary aspect of the invention is an information processing device that stores an image that is to be retained in a main memory so that a processor can execute an application program, and after execution of the application program is terminated, executes the application program from a state at a time when the image is stored by reading out the stored image to the main memory, the information processing device including resource management means for, upon an access request from the application program to a resource, specifying an identifier to identify the resource and notifies the identifier to the application program, and invalidating the identifier upon a request from the application program or after a lapse of a predefined time, wherein when the application program is to be executed by reading out the stored image to the main memory, the information processing device replaces the identifier stored in the image with a newly issued identifier and causes the application program to access to the resource corresponding to the stored identifier.

A fifth information processing device according to another exemplary aspect of the invention is an information processing device that allocates a predefined area in volatile storage unit in which memory contents will disappear upon suspension of power supply to an application program, and carries out information processing based on information stored in the area, the information processing device including storage means for storing an operation image of the application program in a nonvolatile storage unit in which the operation image will not disappear upon suspension of power supply, and read out means for reading out the operation image from the nonvolatile storage unit and storing the read-out operation image in the volatile storage unit.

In one aspect, the present invention can provide an information processing device that can store an execution state of an application program running on multitask processing environment and resume the application program based on the stored execution state.

BRIEF DESCRIPTION OF THE DRAWINGS

The above and other aspects, features, and advantages of the present invention will become more apparent from the following description of certain exemplary embodiments when taken in conjunction with the accompanying drawings, in which:

FIG. 4 is a flowchart for illustrating details of the step S2 of FIG. 3. Referring to FIG. 4, the application interface unit 21 of the application program management means 20 receives a resource use request transmitted by the execution unit 11 of the application program 10 (step S11).

EXEMPLARY EMBODIMENT

First Exemplary Embodiment

Exemplary best modes for carrying out the present invention are explained hereinafter with reference to the drawings. In this exemplary embodiments of the present invention, an operation image of an application program in an information processing apparatus is stored in nonvolatile storage means, so that a work state at a time of the storing operation can be reproduced, even after the power supply is temporarily turned off, by reading out the stored operation image.

Figure 1:
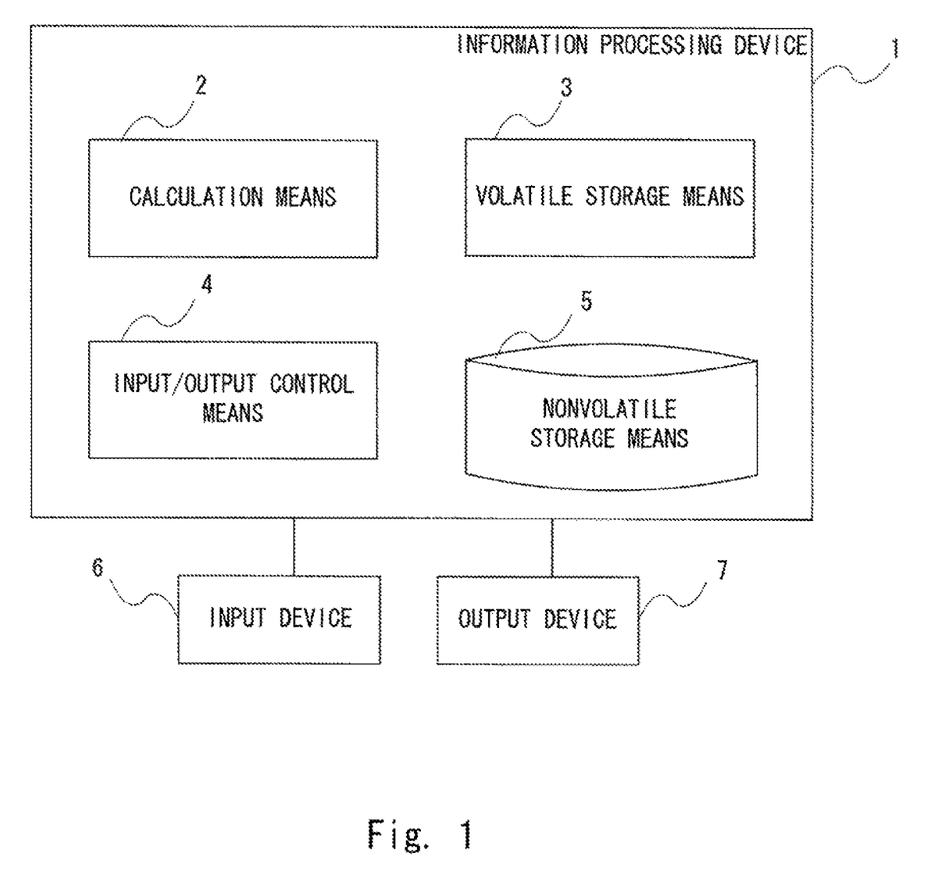
FIG. 1 shows a hardware configuration of an information processing device in accordance with an exemplary embodiment of the present invention.

FIG. 1 shows a hardware configuration of an information processing device in accordance with an exemplary embodiment of the present invention. Referring to FIG. 1, an information processing device 1 includes calculation means 2, volatile storage means 3, input/output control means 4, and nonvolatile storage means 5. Further, the information processing device 1 is connected to an input device 6 and an output device 7. Specifically, the information processing device 1 may be configured by using a device capable of running an application program on the OS (Operating System), such as a personal computer and a server.

The calculation means 2 performs arithmetic processing based on information stored in volatile storage means (details of which are explained later). Specifically, the calculation means 2 may correspond to a processor such as a CPU (central processing unit) The volatile storage means 3 stores information. Contents stored in the volatile storage means 3 will disappear when the power supply is suspended. Specifically, the volatile storage means 3 may correspond to a storage device such as a DRAM (dynamic random access memory) and a SRAM (static random access memory).

The input/output control means 4 controls the input device 6 and the output device 7, both of which are connected to the information processing device 1, and uses these devices so that the calculation means 2 can carry out arithmetic processing. Specifically, the input/output control means 4 may corresponds to a chipset (i.e., a processor having a peripheral device control circuit integrated therein), and can be constructed integrally with a CPU.

The nonvolatile storage means 5 stores calculation results from the calculation means 2. Contents of the nonvolatile storage means 5 will not disappear even after the power supply is suspended. Specifically, the nonvolatile storage means 5 can be configured from a hard disk drive, a flash memory, or rewritable optical disk drive or the like.

The input device 6 conveys external information to the information processing device 1. Specifically, the input device 6 may correspond to a keyboard, a mouse, a camera, or scanner or the like. The output device 7 receives information from information processing device 1 and outputs it externally. Specifically, the output device 7 may correspond to a display device, a speaker, or a printer or the like. Although the input device 6 and the output device 7 are depicted as separate devices from the information processing device 1 in this exemplary embodiment of the present invention, they can be configured integrally with the information processing device 1.

Figure 2:
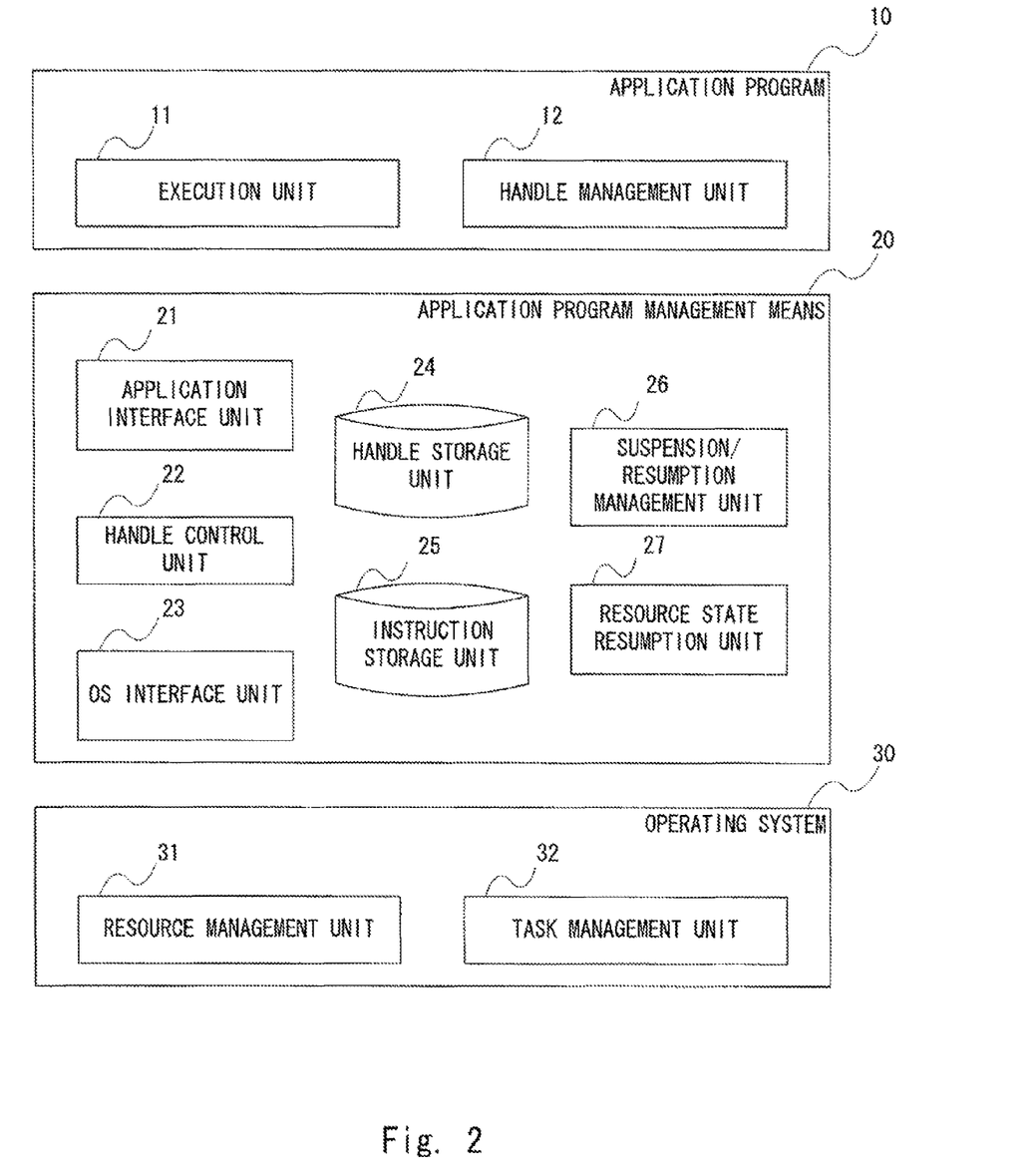
FIG. 2 is a functional block diagram of an information processing device in accordance with an exemplary embodiment of the present invention.

FIG. 2 is a functional block diagram of an information processing device 1 in accordance with an exemplary embodiment of the present invention. Referring to FIG. 2, functions of the information processing device 1 in accordance with this exemplary embodiment are broadly configured from an application program 10, application program management means 20, and an operating system 30. Specifically, the application program 10 may be word-processor software, presentation software, or moving-image reproducing software or the like. The application program management means 20 is utility software. The operating system 30 can be configured from certain software capable of providing an interface generated by abstracting a hardware resource of the information processing device 1 to the application program 10

The application program 10 includes an execution unit 11 and a handle management unit 12. The execution unit 11 executes functions that the application program 10 provides by accessing to resources managed by the information processing device 1, such as data files stored in the nonvolatile storage means 5 and a display device connected to the information processing device 1, i.e., the output device 7, by using handles.

The handle management unit 12 stores handles, i.e., unique identifiers assigned corresponding to requests for the use of the above-described resources issued by the execution unit 11, in a state where handles are associated with corresponding resources. That is, the handle is an identifier to identify a resource that is used at that moment in this example.

The application program management means 20 includes an application interface unit 21, a handle control unit 22, an OS (Operating System) interface unit 23, a handle storage unit 24, an instruction storage unit 25, suspension/resumption management unit 26, and a resource state resumption unit 27. Furthermore, the application program management means 20 stores resources used by the application program 10 and corresponding handles, and performs control in such a manner that when the application program 10 is resumed from suspension, the application program 10 can use current resources with the same handles that were used before the suspension.

The application interface unit 21 receives requests for the use of resources and instructions in regard to resources identified by handles from the application program 10. When the application interface unit 21 receives an instruction for a resource, if the resource cannot be used by the handle that is used in the instruction to designate the resource, the handle control unit 22 changes that handle to one that can be used for that resource, and passes it to the OS interface unit 23.

The OS interface unit 23 transmits a request for the use of a resource (hereinafter called "a resource use request" or "a use request for a resource") received by the application interface unit 21 to the operating system 30 without carrying out any additional process or after making some change.

The handle storage unit 24 associates and stores the handle and the resource. The instruction storage unit 25 associates and stores the resource and the instruction. The suspension/resumption management unit 26 receives a suspension instruction for the application program 10 from a user through the input device, and instructs the operating system 30 that the calculation means 2 should not carry out any further process for the application program 10. Further, the suspension/resumption management unit 26 also copies contents in an area of the volatile storage means 3 used by the application program 10 to the nonvolatile storage means 5.

The resource state resumption unit 27 resumes a resource that was used by the application program 10 before the suspension to a state at the time when the application program 10 is suspended, and thereby to a usable state. The term "to resume" means to make the newly allocated resource identical to the one at the time when the resource was suspended as viewed from the application program 10, for example, by requesting the operating system 30 for the use of a resource and receiving a newly assigned handle, or reissuing an instruction that was transmitted to the resource before the application program 10 is suspended.

The operating system 30 includes a resource management unit 31 and a task management unit 32, and manages and controls the whole information processing device 1. The resource management unit 31 manages resources of the information processing device 1, and permits the use of resources by receiving use requests from the application program 10 and issuing unique handles. Further, when the application program 10 is to be terminated, it releases the resource upon reception of a resource release notification so that other application programs can use the resource. Furthermore, a resource for which use is permitted will be also released when an unused period during which the resource is not used exceeds a predefined period.

The task management unit 32 manages a time during which the calculation means 2 is used to execute an application program 10 or the operating system 30 or the like. That is, by changing the subject that is to be calculated by the calculation means 2 in a predefined time period, it becomes possible to execute a plurality of programs in parallel. In this way, it is also possible to perform such control that operations of certain programs are not carried out by the calculation means 2, if required, so that other programs are executed preferentially.

Figure 3:
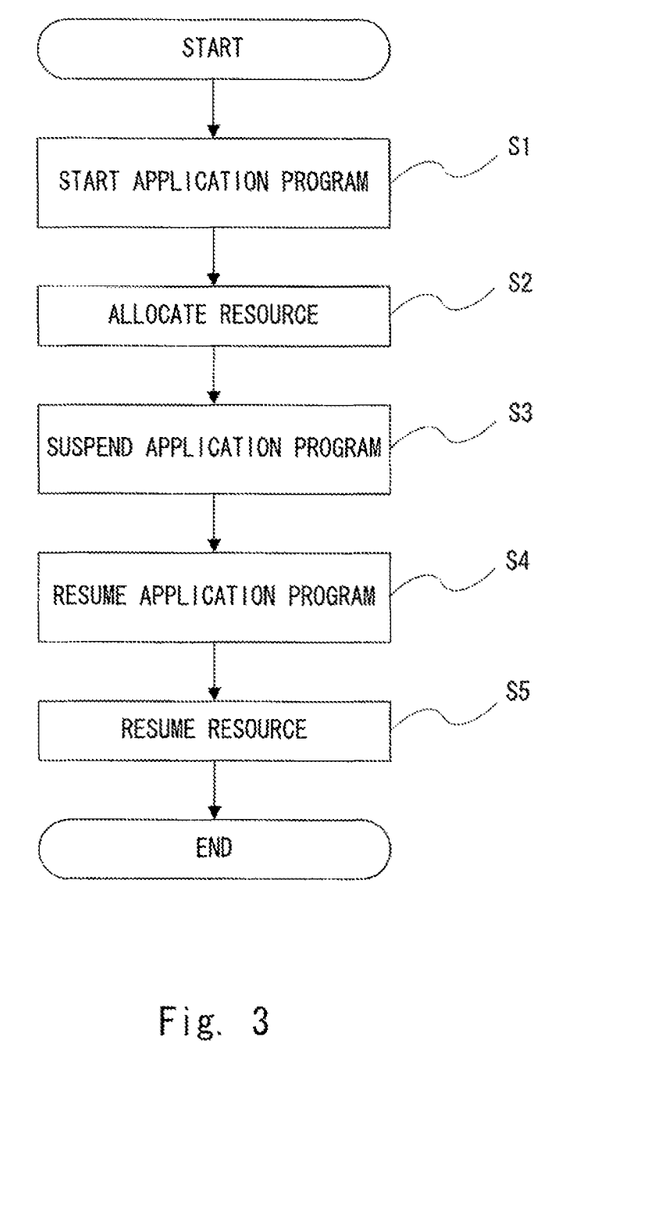
FIG. 3 is a flowchart for illustrating operations with which an information processing device in accordance with an exemplary embodiment of the present invention starts, suspends, and resumes an application program.

Next, operations of the information processing device 1 in accordance with an exemplary embodiment of the present invention are explained hereinafter with reference to FIGS. 3 to 7. FIG. 3 is a flowchart for illustrating operations with which an information processing device 1 in accordance with this exemplary embodiment starts, suspends, and resumes an application program 10. Referring to FIG. 3, the calculation means 2 first starts an application program 10 (step S1). Specifically, the start of the application program 10 can be carried out by reading out an execution file of the application program 10 stored in the nonvolatile storage means 5 and storing it in the volatile storage means 3, and executing it by the calculation means 2.

Next, the application program 10 requests the use of a resource, and receives the allocation (step S2). Detailed operations for the resource allocation will be explained later with reference to FIG. 4. After receiving the resource allocation, the application program 10 causes the execution unit 11 to execute a function by using the resource.

Next, the application program 10 is suspended by a predefined condition such as manipulation made by a user (step S3). Specifically, the task management unit 32 first performs such control that no operation is carried out for the application program 10 by the calculation means 2. Then, it transfers information stored in an area of the volatile storage means 3 assigned for the operations of the application program 10 to the nonvolatile storage means 5.

After the application program 10 was suspended in the step S3, the application program 10 is resumed by a predefined condition such as manipulation made by a user (step S4). Specifically, the information stored in an area of the nonvolatile storage means 5 is read out and stored in the volatile storage means 3. Further, the task management unit 32 manages the area of the volatile storage means 3 so that the calculation means 2 performs operations on that area.

Next, the resource is resumed in such a manner that the resumed application program 10 can use the resource in a similar way as it used before the suspension (step S5).

Detailed operations for the resource resumption will be explained later in detail with reference to FIGS. 5A and 5B. By operating as shown in FIG. 3, the information processing device 1 can continue the operation, even after the information processing device 1 is resumed, in a similar manner to the operation carried out before the suspension.

Figure 4:
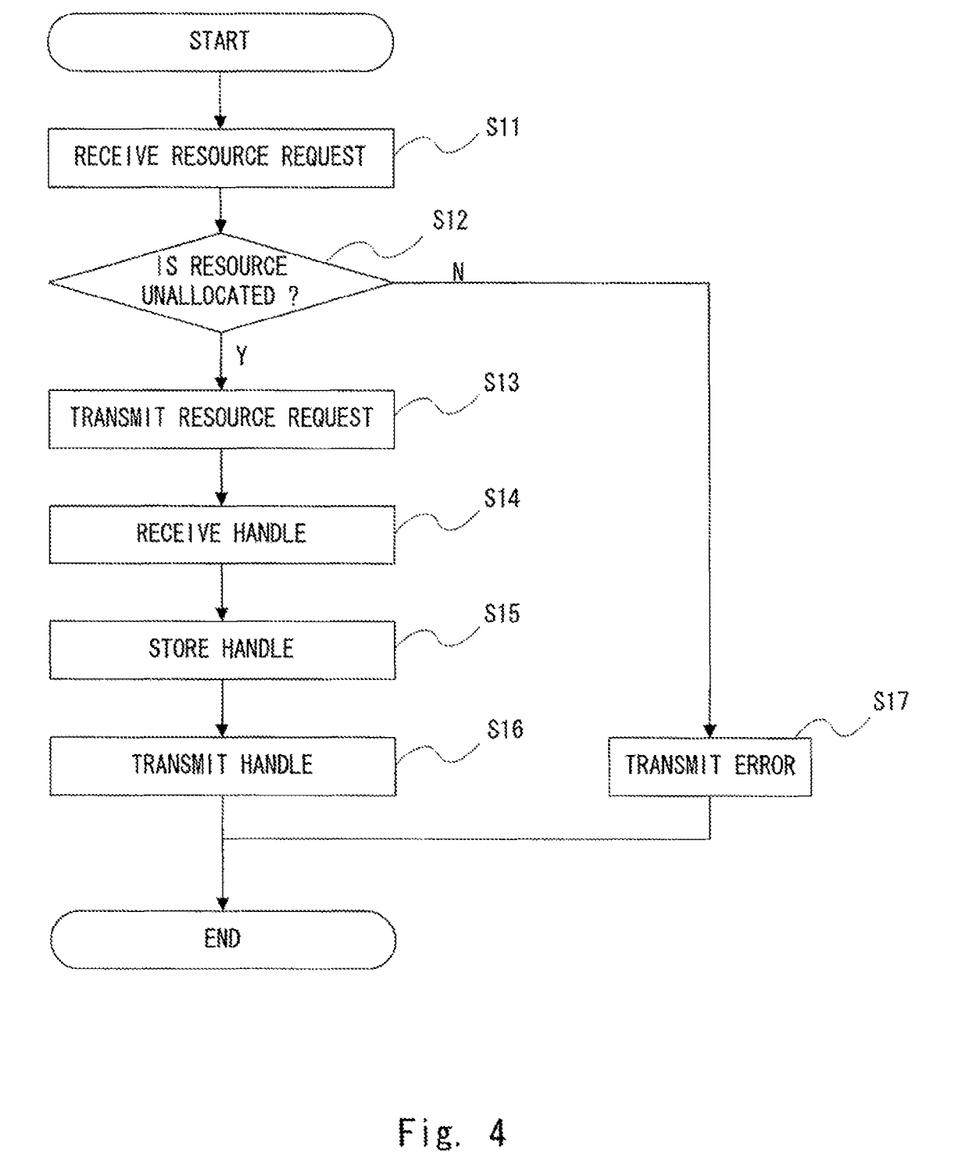
FIG. 4 is a flowchart for illustrating operations of the application program management means 20 when the application program 10 starts to use a resource. That is.

FIG. 4 is a flowchart for illustrating operations of the application program management means 20 when the application program 10 starts to use a resource. That is, FIG. 4 is a flowchart for illustrating details of the step S2 of FIG. 3. Referring to FIG. 4, the application interface unit 21 of the application program management means 20 receives a resource use request transmitted by the execution unit 11 of the application program 10 (step S1).

The handle control unit 22 determines whether the resource for which the request received by the application interface unit 21 is issued is already allocated or not by referring to the handle storage unit 24 (step S12). The process in a step S17 that is carried out when the resource is determined to be already allocated will be explained later.

If the resource for which the request is issued is determined to be not yet allocated in the step S12, the handle control unit 22 transmits the resource use request received from the application program 10 to the operating system 30 through the OS interface unit 23 (step S13).

Then, the OS interface unit 23 receives a handle corresponding to the resource for which use is requested from the operating system 30 (step S14), and the handle control unit 22 stores the received handle in the handle storage unit 24 (step S15). At this point, the handle control unit 22 stores the handle in a state where the handle is associated with a corresponding application program and a corresponding resource.

Figure 5A:
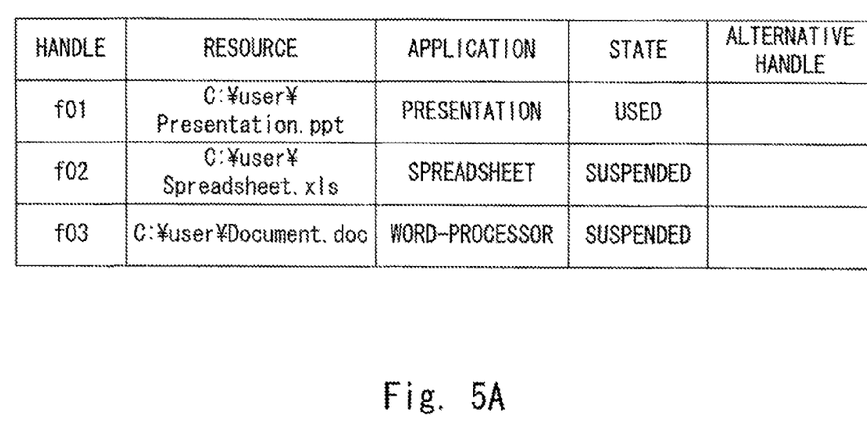
FIG. 5A shows relations among handles, application programs, and resources in a handle storage unit.
Figure 5B:
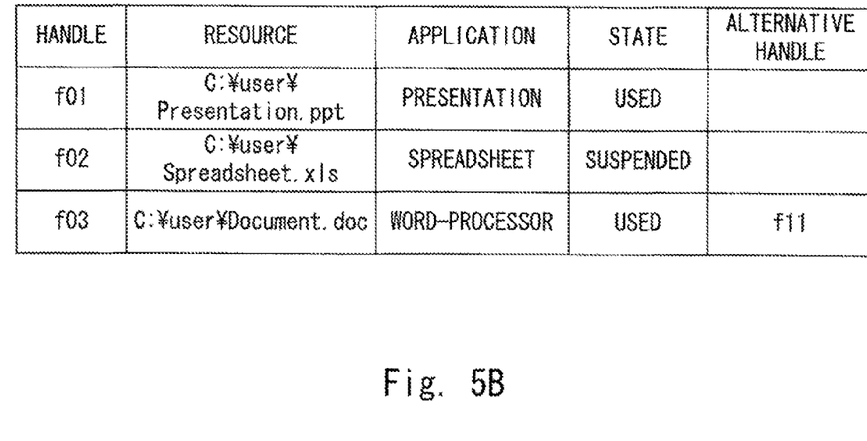
FIG. 5B shows relations among handles, application programs, and resources in a handle storage unit.

FIGS. 5A and 5B show relations among handles, application programs, and resources in the handle storage unit 24. As shown in FIG. 5A, handles, application programs, and resources are stored in a state where they are associated with each other in the handle storage unit 24, and at this point, the state of that resource is changed to "used".

Next, the application interface unit 21 transmits the received handle to the application program 10 (step S16), and after that, the application program 10 can use the resource by specifying it by its handle.

If the resource for which the request is issued is already allocated, e.g., if the resource is used exclusively by other application programs, the handle control unit 22 transmits a message indicating that the requested resource is unavailable. In this way, the application program 10 can perform an alternative process such as providing an indication to urge user's decision or suspending the process.

Figure 6:
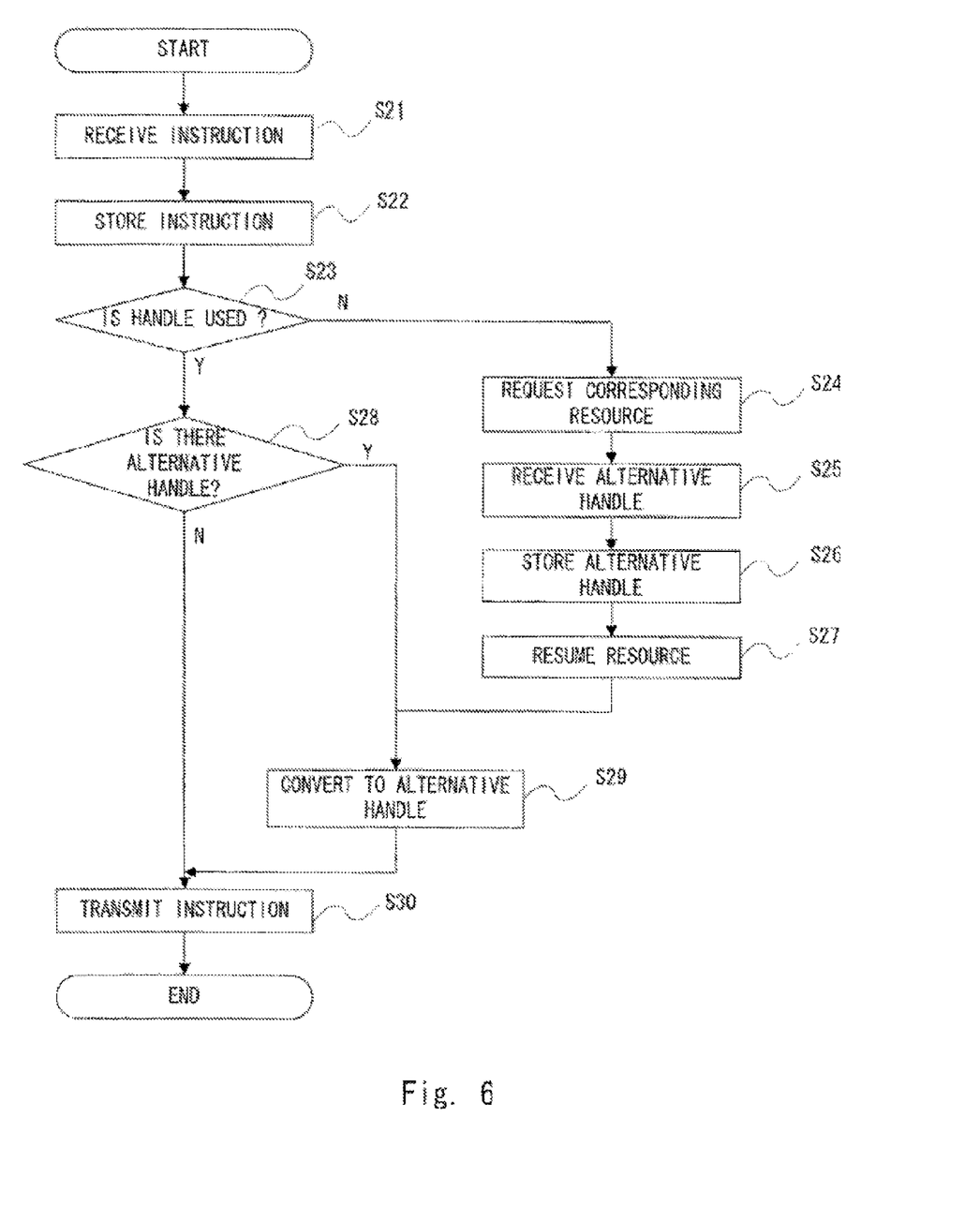
FIG. 6 is a flowchart for illustrating operations of application program management means when an instruction for resources is received from an application program.

FIG. 6 is a flowchart for illustrating operations of the application program management means 20 when an instruction for resources is received from the application program 10. In particular, the operation that is carried out when an instruction is received from the application program 10 after the application program 10 is resumed from the suspended state corresponds to the step S5 of FIG. 3.

Referring to FIG. 6, the application interface unit 21 receives an instruction in which a resource is designated by a handle from the application program 10 (step S21). At this point, when the application program 10 was already suspended from the startup state and resumed after the temporary suspended state, the application program 10 itself operates in a similar manner to the operation carried out before the suspension. Therefore, the application program 10 can use a handle that is managed by the handle management unit 12 before the suspension without requiring any additional process for the designation of a resource.

Figure 7:
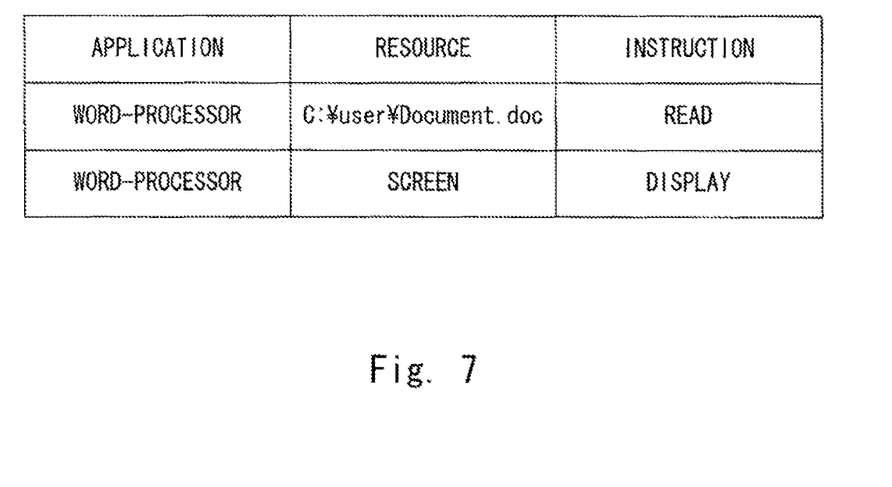
FIG. 7 shows relations among application programs, resources, and instructions in an instruction storage unit.

Next, the application interface unit 21 stores the received instruction in the instruction storage unit 25 in a state where the instruction is associated with a corresponding handle, an application program, and a resource to be designated (step S22). FIG. 7 shows relations among application programs, resources, and instructions in the instruction storage unit 25. As shown in FIG. 7, application programs and resources are stored in a state where they are associated with each other in the instruction storage unit 25.

Next, the handle control unit 22 determines whether the received handle is available or not at that moment in order to specify the resource for which the received instruction is issued (step S23). Specifically, the handle control unit 22 determines whether or not the resource for which the instruction is issued is being used by the application program 10 that transmitted the instruction by referring to contents in the handle storage unit 24 shown in FIG. 5A. The operation in a step S28 that is carried out when the handle is determined to be currently used in the step S23 will be explained later.

If the handle is determined to be not being used in the step S23, the handle control unit 22 transmits a resource use request to the operating system 30 through the OS interface unit 23 (step S24), receives a handle corresponding to the resource from the operating system 30 (step S25), and stores the received handle in the handle storage unit 24 as an alternative handle (step S26).

Referring to FIG. 5A, it can be seen that an application program "word-processor" was using a file "C:¥user¥Document.doc" with a handle "f03", and that the application program "word-processor" is suspended and unused at that moment. When the application program "word-processor" is resumed and it transmits an instruction by designating the handle "f03" in order to use the file "C:¥user¥Document.doc", the handle control unit 22 acquires a new handle "f11", stores it as an alternative handle, and changes the state to "used". By doing so, the state becomes the one shown in FIG. 5B.

Next, the resource state resumption unit 27 resumes the resource to a state at the time when the application program 10 was suspended (step S27). Specifically, it can resume the resource by, for example, referring to the instruction storage unit 25 and reading out an instruction that is transmitted for that resource by the application program 10 before the suspension, and transmitting the instruction again. In the example shown in FIG. 7, the application software "word-processor" can resume the state where the file "C:¥user¥Document.doc" is displayed in a "screen" by transmitting a read instruction to the file "C:¥user¥Document.doc" and transmitting a display instruction to the screen.

If the handle is determined to be currently used in the step S23, the OS interface unit 23 determines whether an alternative handle corresponding to that handle is stored or not by referring to the handle storage unit 24 (step S28). That is, when the handle storage unit 24 stores information like the one shown in FIG. 5B, if a use instruction in regard to a handle "f03" is received, it is determined that an alternative handle "f11" is stored. The process in a step S30 that is carried out when the alternative handle is determined to be not stored will be explained later.

If the alternative handle corresponding to the handle is determined to be stored in the step S28, the handle control unit 22 replaces the handle that designates a resource in the instruction received by the application interface unit 21 with the alternative handle (step S29).

Subsequent to the step S29, the OS interface unit 23 transmits the instruction in which the handle is replaced to the operating system 30. Further, if the alternative handle is determined to be not stored in the step S28, the OS interface unit 23 transmits the received instruction to the operating system 30 without carrying out any additional process (step S30). In this way, even after the application program 10 is resumed from a suspended state, the application program 10 can use a resource by using the same handle as that used before the suspension.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. An information processing device comprising:
   an application interface unit that
      receives from an application program a request to use a resource,
      sends to the application program a first handle used as an identifier to identify the resource,
      receives from the application program an instruction to use the resource wherein the instruction designates the resource by including the first handle identifying the resource,
      and, that causes an instruction storage unit to store, by associating, the received instruction, the first handle, the application program, and the designated resource in a state that specifies that the first handle that designates the resource is used;
   a suspension/resumption management unit that
      suspends the application program upon receipt of an instruction to suspend and changes the state of the first handle that designates the resource from used to suspended,
      resumes the application program upon receipt of an instruction to resume and transmits the instruction to use the resource again, the instruction including the first handle to identify the resource; and
   a handle control unit that
      determines whether or not the first handle that designates the resource in the instruction is being currently used by the application program, wherein the first handle that designates the resource is currently used by the application program when the state specifies that the first handle that designates the resource is used, and the resource is not currently used when the state specifies that the first handle that designates the resource is suspended,
      when the first handle is determined not to be currently used, requests to an operating system the resource, receives a second handle corresponding to the resource from the operating system, and stores the received second handle in a handle storage unit as an alternative handle,
      when the first handle is determined to be currently used, determines whether the alternative handle corresponding to the first handle is stored or not by referring to the handle storage unit, and
      when the alternative handle is determined to be stored, replaces the first handle that designates the resource in the instruction received by the application interface unit with the alternative handle, wherein the replacing is not performed by the application program.

2. The information processing device according to claim 1, wherein the handle control unit transmits the instruction received from the application interface unit to the operating system, when the first handle is determined to be currently used and the alternative handle is determined to not be stored.

3. The information processing device according to claim 2, wherein upon receipt of the instruction to suspend, the suspension/resumption management unit causes the storage unit to store contents stored in an area of a volatile storage unit assigned for the execution of the application program in a nonvolatile area.

4. The information processing device according to claim 3, wherein upon reception of the instruction to resume the application program, the suspension/resumption management unit causes the read out unit to read out the contents stored in the nonvolatile area and to store the read-out contents in the volatile storage unit.

5. The information processing device according to claim 2, further comprising:
   an application program control unit that transmits a use request for the resource to the operating system.

6. The information processing device according to claim 3, wherein upon reception of the instruction to resume the application program, the suspension/resumption management unit resumes the resource to a state at a time when execution of the application program was suspended.

7. An information processing method comprising:
   receiving from an application program a request to use a resource;
   sending to the application program a first handle used as an identifier to identify the resource;
   receiving from the application program an instruction to use the resource wherein the instruction designates the resource by including the first handle identifying the resource;
   storing, by associating, the received instruction, the first handle, the application program, and the designated resource in a state that specifies that the first handle that designates the resource is used;
   suspending the application program by a user and changing the state of the first handle that designates the resource from used to suspended;
   resuming the application program by the user and transmitting the instruction to use the resource again, the instruction including the first handle to identify the resource;
   determining whether or not the first handle that designates the resource in the instruction is being currently used by the application program, wherein the first handle that designates the resource is currently used by the application program when the state specifies that the first handle that designates the resource is used, and the resource is not currently used when the state specifies that the first handle that designates the resource is suspended;
   when the first handle is determined not to be currently used, requesting to an operating system the resource, receiving a second handle corresponding to the resource from the operating system, and storing the received second handle in a handle storage unit as an alternative handle;
   when the first handle is determined to be currently used, determining whether the alternative handle corresponding to the first handle is stored or not by referring to the handle storage unit; and
   when the alternative handle is determined to be stored, replacing the first handle that designates the resource in the received instruction with the alternative handle, wherein the replacing is not performed by the application program.

* * * * *